United States Patent
James, Jr.

(10) Patent No.: US 8,956,532 B1
(45) Date of Patent: Feb. 17, 2015

(54) WELL WATER RECIRCULATING SYSTEM

(76) Inventor: Jerry M. James, Jr., Climax, NC (US)

(*) Notice: Subject to any disclaimer, the term of this patent is extended or adjusted under 35 U.S.C. 154(b) by 540 days.

(21) Appl. No.: 13/398,803

(22) Filed: Feb. 16, 2012

Related U.S. Application Data

(60) Provisional application No. 61/463,412, filed on Feb. 17, 2011.

(51) Int. Cl.
| | | |
|---|---|---|
| C02F 1/74 | (2006.01) | |
| E21B 21/015 | (2006.01) | |
| B01F 3/04 | (2006.01) | |
| B08B 9/032 | (2006.01) | |
| E21B 37/00 | (2006.01) | |
| C02F 103/06 | (2006.01) | |

(52) U.S. Cl.
CPC ............ C02F 1/74 (2013.01); E21B 21/015 (2013.01); *C02F 2103/06* (2013.01); B01F 3/04049 (2013.01); B08B 9/0327 (2013.01); E21B 37/00 (2013.01)
USPC .............. 210/167.01; 210/170.07; 210/194; 134/169 C; 166/90.1

(58) Field of Classification Search
CPC ...... C02F 1/74; C02F 2103/06; E21B 21/015; E21B 21/06; E21B 21/065; E21B 37/00; B08B 9/032; B08B 9/0321; B08B 9/0327; B01F 3/04049
USPC ............ 210/167.01, 170.01, 170.07, 194; 210/747.7; 166/67, 90.1, 222; 134/166 C, 134/169 C; 239/200; 261/78.2, 115
See application file for complete search history.

(56) References Cited

U.S. PATENT DOCUMENTS

| | | | |
|---|---|---|---|
| 4,444,259 A | | 4/1984 | Schwall |
| 4,478,765 A | * | 10/1984 | Tubbs ...................... 210/170.07 |
| 4,543,186 A | * | 9/1985 | Weisenbarger et al. . 210/170.07 |
| 4,582,610 A | | 4/1986 | Baker |
| 5,354,459 A | | 10/1994 | Smith |
| RE35,074 E | * | 10/1995 | Lamarre .................... 210/747.7 |
| 7,048,861 B2 | | 5/2006 | Beretta, III |
| 7,100,683 B2 | * | 9/2006 | Heilmann et al. .............. 166/68 |
| 7,650,938 B2 | | 1/2010 | Hall et al. |
| 7,942,198 B2 | * | 5/2011 | Zirkle ...................... 210/170.07 |
| 2004/0244974 A1 | * | 12/2004 | Zupanick et al. ............... 166/50 |
| 2010/0327095 A1 | | 12/2010 | Hatten |

* cited by examiner

*Primary Examiner* — Christopher Upton

(74) *Attorney, Agent, or Firm* — QuickPatents; Kevin Prince

(57) ABSTRACT

The present device provides a system for recirculating water in a well to reduce unwanted odor and mineral deposits that develop from stagnated well water. The water recirculation system comprises a wellhead having a vent aperture and a spigot line, a water filter, a nozzle, and a vent adapter, which are coupled with a water pump and water tank to create a mist for recirculating water within the system. The nozzle is positioned to spray the well walls of the well with a mist to reduce material deposits that may otherwise develop. The system operates solely on the water pressure provided by the water pump and water tank.

14 Claims, 2 Drawing Sheets

WELL WATER RECIRCULATING SYSTEM

CROSS-REFERENCE TO RELATED APPLICATIONS

This application claims the benefit of U.S. Provisional Patent Application 61/463,412, filed on Feb. 17, 2011, and incorporated herein by reference.

STATEMENT REGARDING FEDERALLY SPONSORED RESEARCH AND DEVELOPMENT

Not Applicable.

FIELD OF THE INVENTION

This invention relates to a well water recirculation system, and more particularly to a system which passes well water though a filter and redistributes the filtered water into the well by means of a misting nozzle.

DISCUSSION OF RELATED ART

Water wells are excavations in the ground for the purpose of obtaining or gaining access to groundwater. Water wells are typically created by drilling or digging until a satisfactory amount and quality of groundwater is found. A well wall and lining are often used to reduce groundwater contamination and increase the structural stability of a well. The groundwater is typically extracted by an electrical or mechanical pump, although buckets and other containers can be used as well. Water wells vary in capacity, depth, and water quality, and can provide a local supply of drinking water if treated properly.

A wellhead is a device which attaches to the opening of a well to protect the groundwater from external contamination. Wellheads typically include one or more apertures for extracting water and ventilating the well itself. Even with wellhead ventilation, groundwater can become stagnated and develop a sulfuric smell. Furthermore, due to the lack of fluid movement within a water well, mineral deposits often develop inside the well walls.

U.S. Pat. No. 4,582,610 to Baker on Apr. 15, 1986, describes a well water aeration system which removes volatile contaminants from well water pumped through the well pipe of a well into a building. This device is intended to be used inline by splicing an elongated spray conduit into a well pipe, which sprays, aerates, and recirculates a fractional portion of the well water pumped through the well pipe. While this invention is capable of aerating well water, it only aerates a fractional portion of the water, it is not compatible with current standard wellheads, it is not easily installed or serviced, and it will not remove mineral deposits from well walls.

U.S. Pat. No. 5,354,459 to Smith on Mar. 19, 1993, discloses an apparatus for treating water utilizing a treating tank, a fogging nozzle, a means for directing water into the treating tank, a means for injecting compressed air into the water and through the nozzle, a filtering vessel, and a de-aerating vessel. While this invention is capable of filtering well water, it relies on external compressed air, it is not compatible with current standard wellheads, it stores treated water in a tank, it relies heavily on filtration of the elements within the water, and it will not remove mineral deposits from well walls.

U.S. Pat. No. 7,650,938 to Hall el al. on Jan. 26, 2010, describes a residential in-well internal water aerator for reducing/eliminating iron, hydrogen sulfide, and radon gas from the water supply. The device hangs within the well casing utilizes an aerator nozzle, UV light drip chambers, and several granular activated carbon (GAC) chambers in sequence. While this invention is capable of filtering well water, it relies heavily on filtration of the elements within the water, it is not compatible with current standard wellheads, requires expensive GAC filtration material, and will not remove mineral deposits from well walls.

Therefore, there is a need for a device that is capable of aerating groundwater and eliminating mineral deposits by recirculating filtered groundwater within the water well without exposing the groundwater to unnecessary external contamination. Such a device would require relatively little maintenance, and would be inexpensive to manufacture, install, and operate. The present invention accomplishes these objectives.

SUMMARY OF THE INVENTION

The present device provides a system for recirculating water in a well to reduce unwanted odor and mineral deposits that develop from stagnated well water. The water recirculation system comprises a wellhead having a vent aperture and a spigot line, a water filter, a nozzle, and a vent adapter, which are coupled with a water pump and water tank to create a mist for recirculating water within the system.

When operating, water from the water tank will flow through the spigot line and into the water filter. The water filter will clear the incoming water of any large debris that may otherwise clog the system. After filtration, the water will flow through to the vent adapter and into the nozzle. The nozzle is positioned to spray the well walls of the well with a mist to reduce material deposits that may otherwise develop.

The water filtration system can cycle two gallons of water per hour and requires no external power source. The system operates solely on the water pressure provided by the water pump and water tank. Furthermore, the water filters are capable of operating for several years without replacement or maintenance. Lastly, the system can be installed into any water well having a standard wellhead.

The present invention is capable of aerating groundwater and eliminating mineral deposits by recirculating groundwater within the water well without exposing the groundwater to unnecessary external contamination. The present device requires relatively little maintenance, and is inexpensive to manufacture, install, and operate. The present device does not require modification of existing well heads that include the vent aperture. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
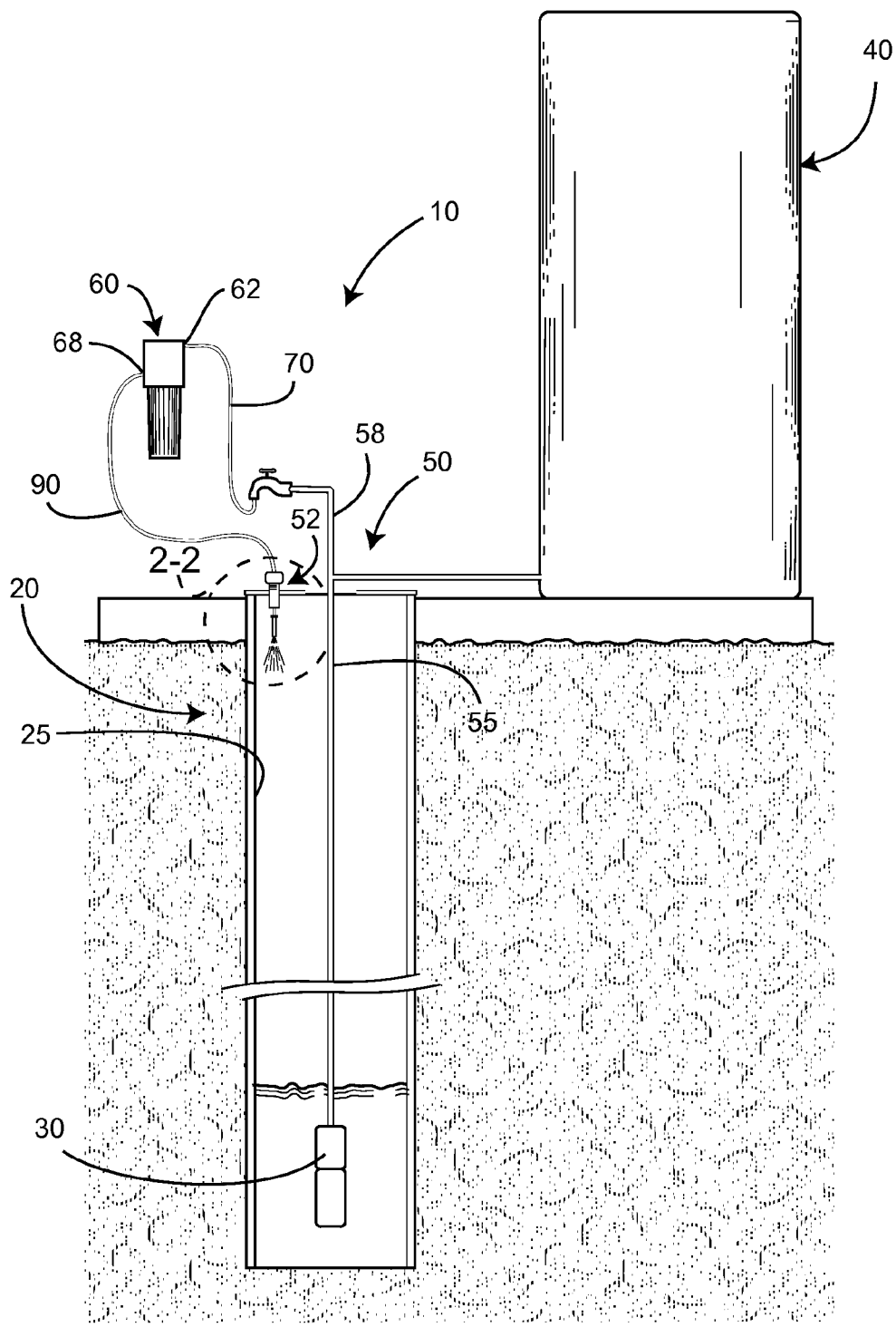
FIG. 1 is a front view of the water filtration system and well.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention provides a system 10 for recirculating water in a well 20 to reduce unwanted odor and mineral deposits that develop from stagnated well water. The water recirculation system 10 is intended for wells 20 having well walls 25, a water pump 30, a water tank 40, and a wellhead 50 having a vent aperture 52 and a spigot line 58. The recirculating system 10 of the present invention includes a nozzle 80 in fluid communication with the spigot line 58 through a water conduit 70, and a vent adapter 100. The spigot line 58 is typically connected with the water pump 30 and the water tank 40, such that the water delivered to the nozzle 80 under pressure create a mist 15 for recirculating water within the system 10. It is understood that the spigot line 58 may be of the type including a spigot near the wellhead 50, or located away from the wellhead 50. In one embodiment, the invention includes the wellhead 50. In a preferred embodiment, however, the system is used with existing wellheads 50 for retrofitting the system 10 to such a well 20.

The wellhead 50 comprises at least one vent aperture 52 and spigot line 58. The wellhead 50 is adapted to seal the well 20, but for a well supply line 55 traversing the wellhead 50 adapted for fluidly connecting the well 20 with the water pump 30 and spigot line 58. In the preferred embodiment, the vent adapter 100 and nozzle 80 are adapted to fit common wellhead 50 vent apertures 52 using typical aperture sizes and thread patterns. In an alternative embodiment, the wellhead 50 is adapted to accept the vent adapter 100 and nozzle 80 in a proprietary format. In a further alternative embodiment, the vent adapter 100 is integrated into the wellhead 50. In yet another embodiment, the vent aperture 52 is formed into an existing wellhead 50, such as in a so-called "pittless" adapter well (not shown).

Figure 4:
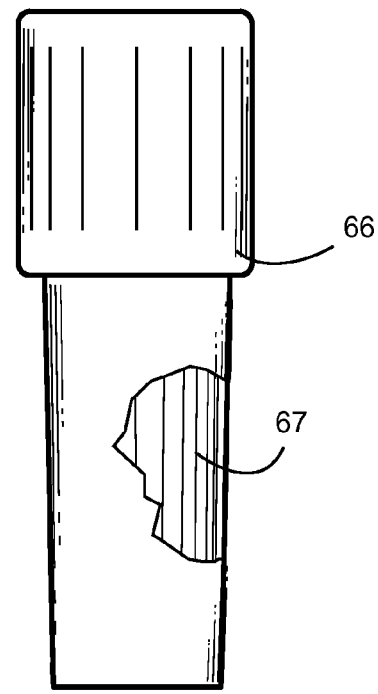
FIG. 4 is a front sectional view of the water filter and filter media.
Figure 5:
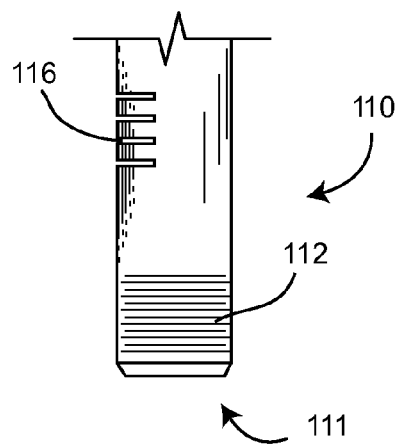
FIG. 5 is a front view of the vent adapter riser.

A water filter 60 may be included that comprises a water inlet port 62 and a water outlet port 68. The water inlet port 62 is adapted to be fluidly connected with the spigot line 58 through the water conduit 70. The water outlet port 68 is adapted to be fluidly connected to the nozzle 80 through a filtered water conduit 90. The water filter 60 includes a removable cap 66 that, when removed, allows access to a removable filter media 67 (FIG. 4), whereby the filter media 67 may be removed for periodic cleaning. The water filter 60 is adapted to filter large debris and other material that may clog the system 10, as opposed to directly filtering sulfur gases, iron, or other materials. The filter media 67 is preferably large enough to filter 10,000-50,000 gallons of water before replacement or other maintenance is required.

Figure 2:
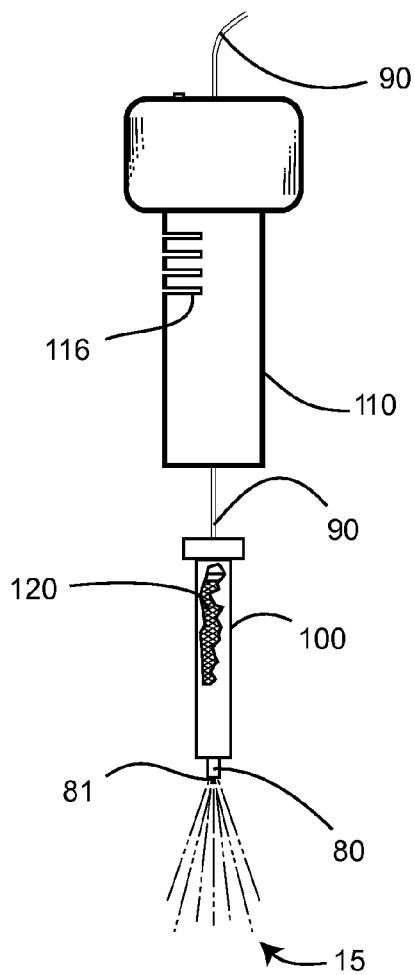
FIG. 2 is a front view of the vent adapter and nozzle.
Figure 3:
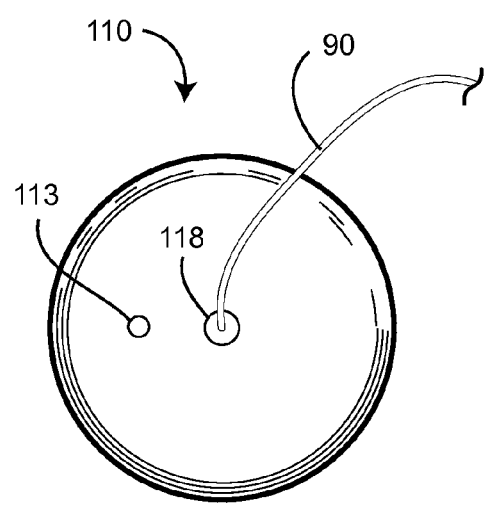
FIG. 3 is a top view of the vent adapter.

In the preferred embodiment with the water filter 60, the nozzle 80 receives water from the filtered water conduit 90 and comprises a misting nozzle 81 to dispense the water in the form of a mist 15. The nozzle 80 is adapted for insertion into the vent aperture 52 of the wellhead 50. In an alternative embodiment, the nozzle 80 may include a secondary filter screen 120 (FIG. 2) to further filter incoming water before distribution to the misting nozzle 81. Preferably the nozzle 81 has a throughput of about 2 gallons per hour, but this can be adapted for each well 20 as needed. The mist 15 when contacting the well walls 25 runs down the well walls 25 to wash away sulfur bacteria and other debris that can cause a "rotten egg" smell to be imparted to the well water, greatly improving the taste and smell of the well water over time.

The vent adapter 100 comprises a riser 110 made of a section of pipe having a thread 112 at a lower end 111 for engagement with the vent aperture 52 of the wellhead 50. The vent adapter 100 further comprises at least one vent adapter aperture 113 and a conduit aperture 118. The filtered water conduit 90 traverses the conduit adapter 118 and attaches to the nozzle 80. The vent adapter aperture(s) 113 may further include a plurality of slots 116 formed through at least one side of the riser 110. The vent adapter aperture(s) 113 and slots 116 are used to release gasses that are present in stagnated water. In the preferred embodiment, PVC pipe is used as the riser 110 material, although any suitable pipe can be used.

When operating, water from the water tank 40 flows through the spigot line 58, water conduit 70, and into the water filter 60. The water filter 60 filters the incoming water of any large debris that may otherwise clog the system 10. After filtration, the water flows through the filtered water conduit 90 and into the nozzle 80. The nozzle 80 is positioned to spray the well walls 25 of the well 20 with a mist 15 to reduce or eliminate material deposits that may otherwise develop.

The water filtration system 10 cycles between 1 and 4 gallons of water per hour, preferably, with the typical well system tank 40 being approximately 10 gallons. As such, the water pump 30 will cycle periodically every several hours to refill the water tank 40 to provide an adequate water supply for the water recirculating system 10. The water recirculating system 10 does not require a power source of its own, relying only on the power source that powers the water pump 30. That is, the present system 10 operates solely on the water pressure provided by the water pump 30 and tank 40.

While a particular form of the invention has been illustrated and described, it will be apparent that various modifications can be made without departing from the spirit and scope of the invention. For example, the drawings illustrate a system having an underwater pump system, while any system can be used so long as water is extracted from the well into a tank. Clearly, in system without a tank, the water pump must be substantially continuously active, but the present system will work with such a system just as a well. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A recirculating system for a well having well walls, a water pump connected to a water tank and a spigot line, and a wellhead with a vent aperture, the recirculating system comprising:
    a nozzle fluidly connected with the spigot line through a water conduit, the nozzle adapted for insertion into the vent aperture of the wellhead; and
    a vent adapter attachable to the vent aperture and including a riser having at least one vent adapter aperture and a conduit aperture, the water conduit traversing the conduit aperture;
    whereby with the vent adapter attached to the vent aperture and with the water conduit traversing the conduit aperture of the vent adapter, and with the water conduit connected with the spigot line, water from the water tank flows through the spigot line, the water conduit, and through the nozzle to spray the well walls of the well, the water pump cycling periodically to refill the water tank.

2. The recirculating system of claim 1 further including a water filter having a water inlet port adapted to be fluidly connected with the spigot line through the water conduit, the water filter having a water outlet port, the nozzle fluidly connected to the water outlet port of the filter through a filtered water conduit, whereby the water from the water tank is filtered before entering the nozzle.

3. The recirculating system of claim 2 wherein the water filter includes a removable cap that, when removed, allows access to a removable filter media, whereby the filter media may be removed for periodic cleaning.

4. The recirculating system of claim 2 wherein the nozzle is a misting nozzle, whereby the water dispensed from the nozzle forms a mist.

5. The recirculating system of claim 2 wherein the riser has a thread at a lower end for engagement with the vent aperture of the wellhead, and wherein the at least one vent adapter aperture includes a plurality of slots formed through at least one side of the riser to release excess gas.

6. The recirculating system of claim 5 wherein the riser is PVC pipe.

7. The recirculating system of claim 2 wherein the nozzle further includes a secondary filter screen to further filter the water before being introduced into the nozzle.

8. A recirculating system for a well having well walls, a water pump connected to a water tank and a spigot line, the recirculating system comprising:
    a wellhead including at least a vent aperture, the wellhead adapted for sealing the well but for said vent pipe and a well supply pipe traversing the wellhead and adapted for fluidly connecting the well to the water pump, tank and spigot line;
    a nozzle fluidly connected with the spigot line through a water conduit, the nozzle adapted for insertion into the vent aperture of the wellhead; and
    a vent adapter attachable to the vent aperture and including a riser having at least one vent adapter aperture and a conduit aperture, the filtered water conduit traversing the conduit aperture;
    whereby with the vent adapter attached to the vent aperture and with the water conduit traversing the conduit aperture of the vent adapter, and with the water conduit connected with the spigot line, water from the water tank flows through the spigot line, the water conduit, and through the nozzle to spray the well walls of the well, the water pump cycling periodically to refill the water tank.

9. The recirculating system of claim 8 further including a water filter having a water inlet port adapted to be fluidly connected with the spigot line through the water conduit, the water filter having a water outlet port, the nozzle fluidly connected to the water outlet port of the filter through a filtered water conduit, whereby the water from the water tank is filtered before entering the nozzle.

10. The recirculating system of claim 9 wherein the water filter includes a removable cap that, when removed, allows access to a removable filter media, whereby the filter media may be removed for periodic cleaning.

11. The recirculating system of claim 9 wherein the nozzle is a misting nozzle, whereby the water dispensed from the nozzle forms a mist.

12. The recirculating system of claim 9 wherein the riser has a thread at a lower end for engagement with the vent aperture of the wellhead, and wherein the at least one vent adapter aperture includes a plurality of slots formed through at least one side of the riser to release excess gas.

13. The recirculating system of claim 12 wherein the riser is PVC pipe.

14. The recirculating system of claim 9 wherein the nozzle further includes a secondary filter screen to further filter the water before being introduced into the nozzle.

* * * * *